Nov. 21, 1950     C. C. SMITH     2,530,843
PHOTOGRAPHIC ENLARGER
Filed Jan. 3, 1948
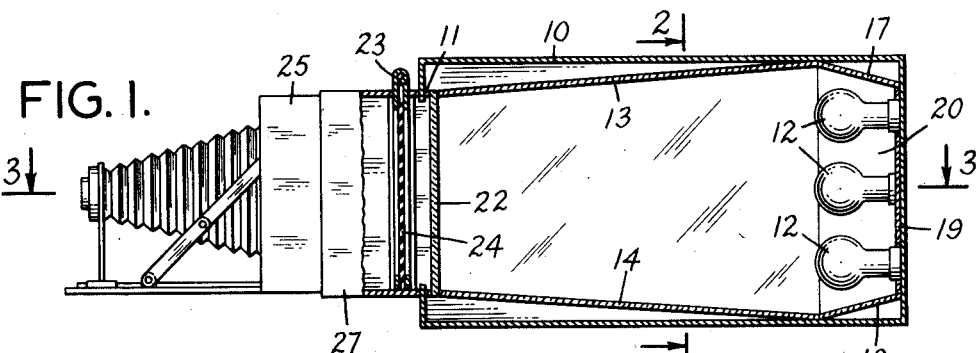
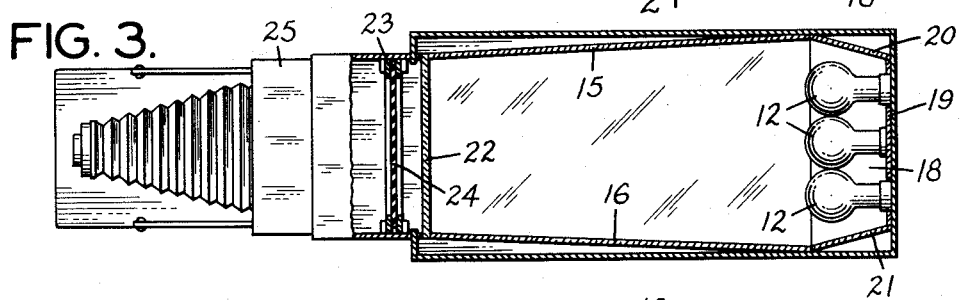
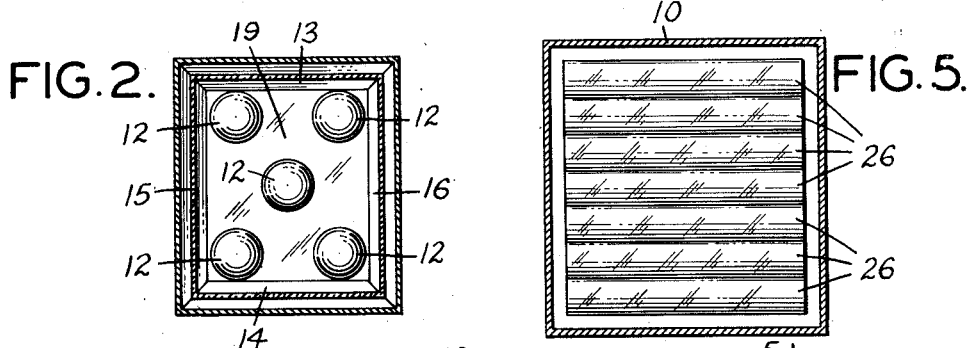
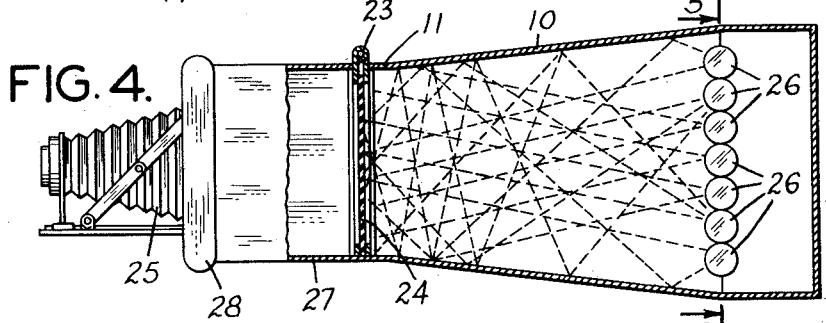
INVENTOR.
CLARENCE C. SMITH
BY Campbell, Brumbaugh & Free
HIS ATTORNEYS.

Patented Nov. 21, 1950

2,530,843

UNITED STATES PATENT OFFICE 2,530,843

PHOTOGRAPHIC ENLARGER

Clarence C. Smith, Flushing, N. Y., assignor of one-half to Eugene F. Hartley, Onancock, Va.

Application January 3, 1948, Serial No. 423

1 Claim. (Cl. 88—24)

The present invention relates to photographic apparatus and more particularly to new and improved photographic enlarging devices that are simple and inexpensive in construction yet highly effective in operation.

Several different types of photographic enlarging apparatus have been used heretofore. One simple and inexpensive construction comprises a single electric light bulb provided with a parabolic reflector which directs light against a ground glass screen placed a short distance behind the negative, or other subject to be enlarged. Apparatus of this type has not been found entirely satisfactory because the ground glass absorbs much of the light. Further, the illumination of the ground glass is not uniform but tends to be brightest in the center and less bright around the edges.

In an effort to overcome the deficiencies of the simple form of enlarger described above, condensing lenses have been employed to concentrate light from the source upon the negative. While enlargers of this type provide a generally uniform illumination of the negative, the condensing lenses are relatively expensive. Moreover, the use of a parabolic reflector restricts the light source to a single bulb located at the center of the reflector. In order to provide a high enough light intensity, the single bulb is usually operated at over voltage so that a considerable amount of heat is generated. Hence, the enlarger cannot be left on for very long periods without overheating.

The principal object of the present invention, accordingly, is to provide new and improved photographic enlarging apparatus which produces a relatively intense and even illumination of the subject yet is simple and inexpensive in construction.

Another object of the invention is to provide new and improved photographic enlarging apparatus of the above character which does not employ condensing lenses or other like expensive components.

A further object of the invention is to provide new and improved photographic enlarging apparatus of the above character which comprises an adapter that can be combined with a conventional camera for enlarging purposes.

Still another object of the invention is to provide new and improved photographic enlarging apparatus of the above character in which a plurality of light sources may be employed.

The objects of the invention may be obtained by providing a lamp housing having reflecting walls for reflecting light from a plurality of sources located at one end of the housing to a negative or other subject located at the opposite side of the housing. According to the invention, the reflecting side walls converge from the light source down to the negative so as to concentrate a relatively intense and uniform beam of light upon the latter. The light sources may comprise standard electric light bulbs, for example, in which case it may be desirable to place a diffusing medium such as a ground glass screen between the light sources and the negative. Alternatively, the light sources may be of the electrical discharge type such as conventional fluorescent lamps, for example. In the latter case, the negative can be uniformly illuminated without using a ground glass screen.

By virtue of the novel construction outlined above, a relatively intense and uniform field of illumination is readily obtained in a highly effective manner without resorting to expensive components such as condensing lenses, for example. By providing converging reflecting walls in the apparatus, considerably more direct light from the light sources can be utilized, and since a parabolic reflector or the like is not used, a plurality of light sources can be employed, thus insuring more even and more intense illumination.

Additional objects and advantages of the invention will be apparent from the following detailed description of several typical forms, taken in conjunction with the accompanying drawings, in which:

Fig. 1 is a side view in vertical section of photographic enlarging apparatus constructed according to the present invention;

Fig. 2 is a view in transverse section taken along line 2—2 of Fig. 1, looking in the direction of the arrows;

Fig. 3 is a view in transverse section taken along line 3—3 of Fig. 2, looking in the direction of the arrows;

Fig. 4 is a view in vertical section of a modified form of the invention utilizing fluorescent tubes; and Fig. 5 is a view in transverse section taken along line 5—5 of Fig. 4, looking in the direction of the arrows.

It will be apparent that the present invention may be applied either to conventional enlargers which are complete in themselves or to enlarging adapters which utilize a camera and its lens as part of the enlarger. However, only typical examples of the latter application will be described below by way of illustration.

In Fig. 1 is shown a typical enlarging adapter according to the invention which may comprise, for example, a lamp housing 10 having a substantially rectangular aperture 11 at one end and a plurality of light sources 12 mounted in any suitable manner at its opposite end. The light sources 12 may be, for example, conventional electric light bulbs arranged in any suitable configuration. In the typical example shown in Figs. 1-3, inclusive, five light bulbs 12 are used arranged as shown in Fig. 2.

In accordance with the invention, a plurality of reflecting members 13, 14, 15 and 16 are mounted on the inside surfaces of the lamp housing 10, as shown in Figs. 1-3, inclusive. The light reflecting members 13, 14, 15 and 16 are so arranged that each opposite pair converges from a position near the light sources 12 to the aperture 11 in the lamp housing 10. Additional reflecting members 17, 18, 19, 20 and 21 may be disposed behind the light sources 12 at the proper angles to direct light therefrom forwardly towards the aperture 11, as shown in greater detail in Figs. 1 and 3.

It will be understood that the reflecting member construction described above directs every available amount of light from the sources 12 to the aperture 11 in the lamp housing 10. Further, since a plurality of sources 12 are used and since the reflecting members will produce a plurality of reflections from each source, a highly diffuse field of illumination will be produced at the aperture 11. In order further to diffuse the light from the sources 12, it may be desirable to place a suitable light diffusing medium such as a ground glass screen 22, for example, over the aperture 11, as shown in Fig. 1.

Mounted over the aperture 11, in front of the ground glass screen 22, is a camera adapter 27, the forward end of which may be suitably constructed to fit the back of a conventional camera 25. The length of the adapter 27 should preferably be made equal to the focal length of the lens in the camera 25 when focused on an object about 6 feet away, so as to give the effect of a double extension bellows. Mounted in the rear end of the adapted 27 in front of the aperture 11 is a negative holder 23 of conventional type which is adapted to receive a negative 24 to be enlarged.

The modification shown in Figs. 4 and 5 of the drawings enables a more intense and uniform field of illumination to be obtained with the generation of a minimum amount of heat. This form of the invention is essentially the same as that shown in Figs. 1-3, inclusive, and like parts have been designated by like reference characters. In this embodiment, however, a plurality of discharge tubes such as fluorescent lamps 26, for example, constitute the light sources. The fluorescent lamps 26 are preferably disposed in a common plane and touching one another, as shown in greater detail in Fig. 5. If the fluorescent lamps 26 are spaced apart from one another it may be desirable to place reflecting members behind them to direct light from the rear forwardly, as in the case of the embodiment shown in Fig. 1.

As shown in Fig. 4, it is not necessary to provide a ground glass screen since even illumination of the negative 24 can be obtained without it.

The relative dimensions of the several parts of the novel enlarging apparatus of the invention will depend on the size of the negative to be enlarged. Preferably, the area of the light panel formed by the light sources should be greater than the area of the negative to be enlarged. Also, the length of the light passage formed by the side reflectors should be at least equal to, and preferably greater than the largest dimension of the light panel so as to insure multiple reflection of the light from the light panel.

By way of example, for enlarging 3¼ by 4¼ negatives, the length of the lamp housing 10 might be approximately 7½ inches and the dimensions of the light panel formed by the electric lamps 12 or the fluorescent tubes 26 might be approximately 5½ by 7½ inches. These dimensions are not critical, however, and can be varied without greatly affecting the results produced. For other size negatives the dimensions should be reduced or increased in proportion as will be apparent to those skilled in the art. It will be understood that apparatus properly designed for negatives of one size can be used for smaller negatives without change.

From the foregoing description, it will be apparent that the invention provides highly effective enlarging apparatus which furnishes a relatively intense and uniform field of illumination yet is simple and inexpensive in construction. By providing a plurality of light sources and converging light reflecting surfaces on the walls of the lamp housing, the light concentrated upon the negative is substantially as uniform and as intense as that obtainable with conventional condenser lens enlargers. Further, this is accomplished without using expensive condenser lenses.

Moreover, the reflecting walls of the light box in the novel enlarging apparatus of the invention may be made rectangular in cross-section and proportional to the dimensions of the negative so that all of the light in the beam is useful in the enlarging operation. This is a very considerable advantage over condenser lens enlargers in which a circular beam is formed. In the latter, the circular beam must inscribe the rectangular negative so that approximately one-third or more of the light does not fall on the negative but is wasted.

In addition, many important advantages ensue from the employment of fluorescent tubes as light sources. First, fluorescent light approaches the quality of daylight. Hence, the printing time is materially reduced while the enlarger will not overheat regardless of how long it is left on. This enables the negative to be placed in an open frame negative carrier and eliminates the need for sandwiching the negative between glass plates to absorb the heat. In fact, so little heat is generated that even wet negatives can be enlarged by means of apparatus constructed according to the invention.

The several representative embodiments of the invention described above are obviously susceptible of considerable modification within the spirit of the invention. The reflecting members used may be mirrors or any suitably polished surfaces. The apparatus can also be readily adapted for use with different camera models or for enlarging strip film instead of plates or single negatives, as will be readily apparent to those skilled in the art. Other changes can be made within the scope of the following claim.

I claim:

In photographic enlarging apparatus, the combination of an enclosed lamp housing having a rectangular opening at one end thereof, a subject carrier having a rectangular opening therein mounted with its opening substantially in registry with the opening in the lamp housing, an enlarging lens mounted to receive light transmitted through said subject carrier, electric lamp means disposed in said housing in the end thereof opposite said opening therein, a plurality of straight, diverging, specular reflecting surfaces disposed around said lamp means for directing light from the sides and rear of said lamp means forwardly in the direction of said housing opening, said lamp means and said diverging reflecting surfaces cooperating to form a substantially rectangular light panel of greater area than said carrier, and means forming straight specular reflecting surfaces converging from said light panel to said subject carrier and disposed so as to supplement the illumination of those parts of a subject in said carrier that are not uniformly illuminated by direct rays from said light panel which pass through said enlarging lens, by directing to said parts of the subject converging light rays which pass through the lens, said reflecting surfaces forming a passage of substantially rectangular cross-section extending from said light panel to said carrier, and the length of said passage being at least as great as the maximum dimension of said light panel, whereby all parts of a subject in said carrier will be traversed by light rays originating at said light panel and passing through said lens.

CLARENCE C. SMITH.

REFERENCES CITED

The following references are of record in the file of this patent:

UNITED STATES PATENTS

| Number | Name | Date |
|---|---|---|
| 767,571 | Lande | Aug. 16, 1904 |
| 1,097,211 | Bechstein | May 19, 1914 |
| 1,313,815 | Hansen | Aug. 19, 1919 |
| 1,517,742 | Martin | Dec. 2, 1924 |
| 1,572,899 | Mastrukoff | Feb. 16, 1926 |
| 1,920,671 | Anderson | Aug. 1, 1933 |
| 2,009,262 | Hetherington | July 23, 1935 |
| 2,113,309 | Murray | Apr. 5, 1938 |
| 2,117,754 | Bell | May 17, 1938 |
| 2,254,125 | Tarullo | Aug. 26, 1941 |